(12) United States Patent
Niggl et al.

(10) Patent No.: US 10,894,226 B2
(45) Date of Patent: Jan. 19, 2021

(54) FILTER ELEMENT

(71) Applicant: Voith Patent GmbH, Heidenheim (DE)

(72) Inventors: Volker Niggl, Weingarten (DE); Marcella Renzulli, Ravensburg (DE); Axel Gommel, Ravensburg (DE); Gert Gottschalk, Ravensburg (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 16/360,455

(22) Filed: Mar. 21, 2019

(65) Prior Publication Data

US 2019/0217227 A1 Jul. 18, 2019

Related U.S. Application Data

(63) Continuation of application No. PCT/EP2017/070454, filed on Aug. 11, 2017.

(30) Foreign Application Priority Data

Oct. 5, 2016 (DE) .......................... 10 2016 219 235

(51) Int. Cl.
*B01D 33/23* (2006.01)
(52) U.S. Cl.
CPC ..................................... *B01D 33/23* (2013.01)
(58) Field of Classification Search
CPC .... B01D 33/23; B01D 29/016; B01D 29/031; B01D 29/038; B01D 33/0191; B01D 2201/12; B01D 25/122
USPC ......... 210/232, 493.1, 498, 172.3, 228, 229, 210/231, 330, 331, 406, 416.1, 459, 471, 210/345, 346, 347, 404, 324, 326, 486, 210/488, 487
See application file for complete search history.

(56) References Cited

U.S. PATENT DOCUMENTS

| | | | | |
|---|---|---|---|---|
| 3,948,779 A | * | 4/1976 | Jackson | B01D 33/23 210/331 |
| 3,971,722 A | | 7/1976 | Radford | |
| 5,227,065 A | * | 7/1993 | Strid | B01D 33/23 210/331 |
| 5,330,644 A | * | 7/1994 | Nilsson | B01D 33/23 210/323.1 |
| 5,792,352 A | | 8/1998 | Scheucher et al. | |

FOREIGN PATENT DOCUMENTS

SU 946600 7/1982

OTHER PUBLICATIONS

Notice of Transmission of the International Research Report and the Written Notice Issued the International Searching Authority or Declaration dated Nov. 2, 2017 for International Application No. PCT/EP2017/070454 (12 pages).

* cited by examiner

*Primary Examiner* — Madeline Gonzalez
(74) *Attorney, Agent, or Firm* — Taylor IP, P.C.

(57) ABSTRACT

A filter element of a rotating disc filter including an internal space thereof that is limited by one or more perforated and profiled filter plates and is connected to a vacuum source. Efficiency should herein be increased in that the outside of the filter plates that faces away from the internal space has a plurality of elevations, whose cross section is round or elongated and/or at least one filter plate on the outside facing away from internal space has a plurality of elevations of different shapes and/or sizes.

16 Claims, 3 Drawing Sheets

FILTER ELEMENT

CROSS REFERENCE TO RELATED APPLICATIONS

This is a continuation of PCT application No. PCT/EP2017/070454, entitled "FILTER ELEMENT", filed Aug. 11, 2017, which is incorporated herein by reference.

BACKGROUND OF THE INVENTION

1. Field of the Invention

The present invention relates to a filter element of a rotating disc filter for separating fluids from a suspension, in particular a fibrous suspension.

2. Description of the Related Art

Disc filters in general are used for thickening the suspension, and in the paper industry are used in particular for recovery of fibrous stock.

Due to the pressure difference between the fibrous suspension and the internal space of the filter discs, fiber layer forms on the filter discs. Thus, when the filter discs dip into the fibrous suspension mostly only water penetrates into the internal space of the filter discs.

On emergence, the fiber layer is being removed by doctors and is directed to the appropriate stock outlet or is sprayed with water into the stock outlet.

The filter elements are usually formed by two opposing undulated filter plates which are facing each other.

What is needed in the art is an efficient filler element.

SUMMARY OF THE INVENTION

The present invention provides the filter plates with a respective outside that faces away from the internal space which has a plurality of elevations, whose cross section which progresses parallel to the filter plate is round or elongated, in particular elliptical. Via these elevations the surface of the filter plates can be considerably increased, which correspondingly affects the dewatering capacity of the filter element. For this reason, the elevations may be advantageously located exclusively in the perforated region of the respective filter plate.

The present invention also provides a filter element of a rotating disc filter for separating fluids from a fibrous suspension. The filter element includes a vacuum source, at least two filter plates that are each perforated and profiled and have an outside, and an internal space in between the at least two filter plates. The internal space is limited by the at least two filter plates and is connected to the vacuum source, wherein each outside of the at least two filter plates that faces away from the internal space has a plurality of elevations whose cross section is one of round and elongated.

Alternatively, or in addition the dewatering efficiency can specifically be influenced in that at least one filter plate on the outside facing away from the internal space has a plurality of elevations of different shapes and/or sizes, in particular in regard to the cross section which progresses parallel to the filter plate. The filter plates are produced easily and cost effectively by forming a sheet metal under combined tensile and compressive conditions—also referred to as deep drawing.

The height of the elevations should herein be between 2 and 20 mm, preferably between 4 and 12 mm, regardless of the embodiment.

It can thus be advantageous for the easy removal of the fiber layer if at least one, for example two opposing filter plates of the filter element are substantially flat, and the profile is formed solely by the elevations.

On the other hand, a very large filter surface results, if at least one, for example two opposing filter plates of the filter element have undulated cross sections with elevations at least on the wave crests of the outside.

If the wave crests do not progress in a linear manner, the filter surface may thereby even be further enlarged.

On the other hand, a linear progression of the wave crests facilitates the formation of flow channels in the internal space of the filter element in the direction of the vacuum source.

The dewatering capacity of the filter plate can be specifically influenced through a variation of the progression of the wave profile of a filter plate, in particular in regard to frequency and amplitude of the wave.

In the interest of high stability of the filter element it is advantageous if the waves of two opposing filter plates of the filter element progress tilted toward one another.

However, configuration of the formation of flow channels in the internal space of the filter element toward the vacuum source is easier if the waves of two opposing filter plates of the filter element progress parallel to one another.

Several large flow channels result, if the wave crests of the outside of one filter plate in each case are arranged opposite the wave crests of the outside of the other filter plate of the filter element.

Only one flow channel results if the wave crests of the outside of one filter plate in each case are arranged opposite the wave trough of the outside of the other filter plate of the filter element.

For the use in disc filters for the treatment of fibrous stock suspensions, the filter element may be arranged in a configuration of circular segments and may be mounted on a hollow shaft that is connected with the vacuum source. The circular filter disc is herein composed of several filter elements.

To establish a reliable and simple connection between the hollow shaft or respectively a channel in the hollow shaft and the internal space of the filter elements attached thereto, the hollow shaft may have several openings on the outside surface, wherein a separate opening may be allocated to each filter element.

To facilitate drainage of the filtrate, the internal space should be equipped with a number of flow channels in the direction of the vacuum source or in other words the hollow shaft, whereby the minimum distance between two opposing filter plates of the filter element increases in the direction of the vacuum source.

For the same reason it may be advantageous if the filter plates have no perforation in the end region leading to the hollow shaft.

Production of the filter elements is especially straightforward if two filter plates that border the internal space of the filter element are connected with one another by a positive interlocking fit.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
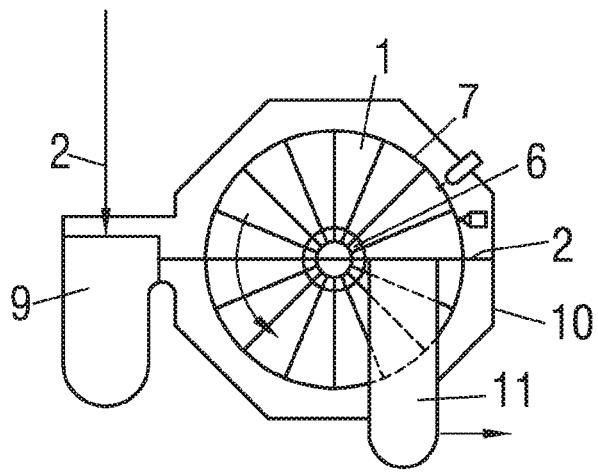
FIG. 1 illustrates a side view of a disc filter.

Referring now to the drawings, and more particularly to FIG. 1, there is shown a fibrous stock suspension 2 that is led via an inlet 9 into container 10 of the disc filter. Located in container 10 is a horizontally progressing and rotatably mounted hollow shaft 6 with a number of perpendicular filter discs 7 that are arranged axially at a distance from one another. Filter discs 7 respectively are formed by a number of filter elements 1 in the form of circular segments, each of which are connected with hollow shaft 6 via one sector base 12.

To reduce manufacturing costs, hollow shaft 6 consists of a number of modules extending in axial direction and arranged adjacent to one another in a circumferential direction.

Filter elements 1 include an internal space 5 that is connected via a separate opening in hollow shaft 6 with a channel therein for conveyance of fluid. Internal space 5 of filter elements 1 is limited by two perforated filter plates 3 that are arranged axially at a distance from one another.

Figure 11:
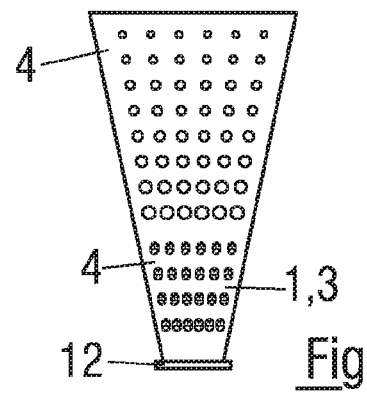
FIG. 11 illustrates a filter plate with elevations 4 of different sizes.

Filter plates 3 according to FIG. 11 have no perforation in the end section comprising sector base 12 leading to hollow shaft 6.

In order to be able to remove the water from suspension 2, hollow shaft 6 that is connected with a vacuum source is connected with internal space 5 of filter elements 1.

The fiber layer forming on the outside of filter elements 1 is conveyed into stock outlet 11 after emerging from suspension 2.

For the purpose of enlarging the effective filter surface, filter plates 3 on their outside that is facing away from internal space 5—as can be seen in FIGS. 2-5, 7, 8, and 11—have a plurality of elevations 4 with round or elongated, in particular elliptical cross section that progresses parallel to the filter plate.

Since filter plates 3 generally are produced from a preferably deep-drawn sheet metal, elevations 4 create at the same time also an expansion of internal space 5. It may be advantageous herein to design filter plates 3 with sector base 12 as a single component and/or to positively interlock the two filter plates 3 that limit internal space 5 of filter element 1 along the outside circumference, for example, by tacking or clinching.

To allow elevations 4 to become effective, they are located exclusively in the perforated region of filter plates 3. The round outer contour of elevations 4 thereby prevents too much abrasion on same during operation. To be able to adapt elevations 4 better to the specific characteristics of filter element 1 it can also be advantageous to provide a plurality of elevations 4 of varying shapes and/or sizes on the outside.

FIG. 11 illustrates one design featuring circular elevation 4 of varying diameters, and elongated elevations 4 on a filter plate 3.

Since elevations 4 often already ensure a sufficiently large filter surface, one or both opposing filter plates 3 of filter element 1 can be substantially flat, as shown in FIGS. 2, 7, 8, and 11.

Via a gradually increasing distance between opposing filter plates 3 in the direction of hollow shaft 6, internal space 5 can be enlarged without problem in the region of hollow shaft 6, thus facilitating discharge of the filtrate in direction of hollow shaft 6.

Figure 4:
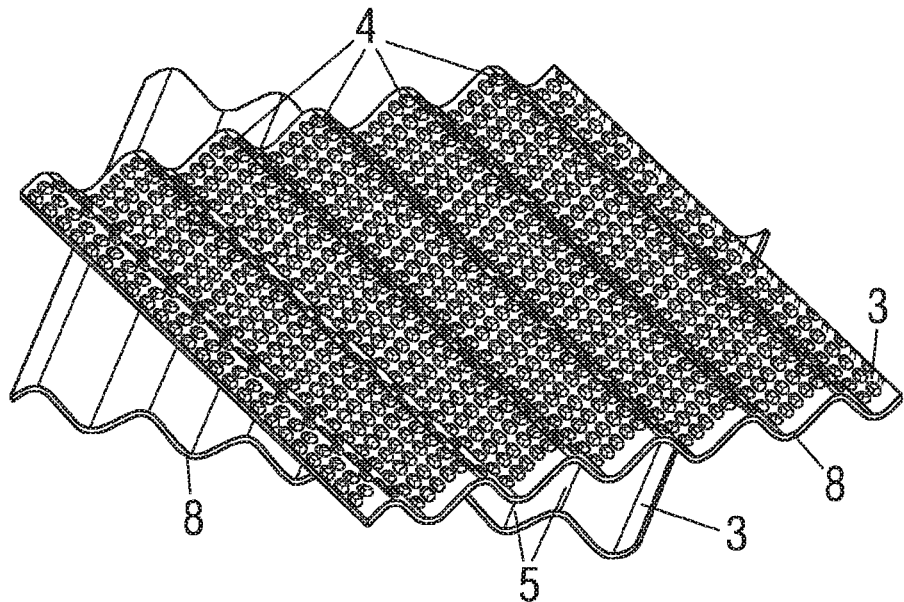
FIG. 4 illustrates two undulated filter plates of a filter element with inclined waves.
Figure 5:
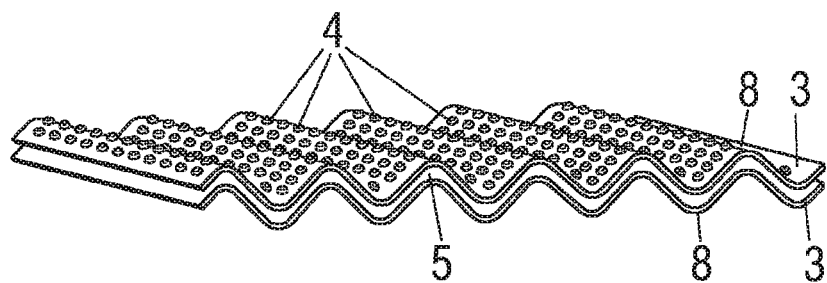
FIG. 5 illustrates two undulated filter plates of a filter element with parallel waves.

For the purpose of creating a very large filter surface at least one, preferably both, opposing filter plates 3 of filter element 1 can have an undulated cross section with elevations 4 on at least the wave crests 8 of the outside (FIGS. 4-5).

FIG. 4 shows an example wherein the linearly progressing wave crests 8 of both opposing filter plates 3 of filter element 1 are tilted toward one another in the plane of filter disc 7.

In contrast thereto the also linearly progressing wave crests 8 of both opposing filter plates 3 of filter element 1 in FIG. 5 progress parallel relative to one another. It is hereby possible that wave crests 8 of the outside of one filter plate 3 are always located opposite the outside of the other filter plate 3, thus always forming a flow channel between the respectively opposing wave crests 8. However, FIG. 5 shows an alternative design wherein wave crests 8 of the outside of a filter plate 3 are always located opposite the wave troughs of the outside of the other filter plate 3 of filter element 1. This creates a substantially uniformly wide internal space 5 between filter plates 3.

Figure 6:
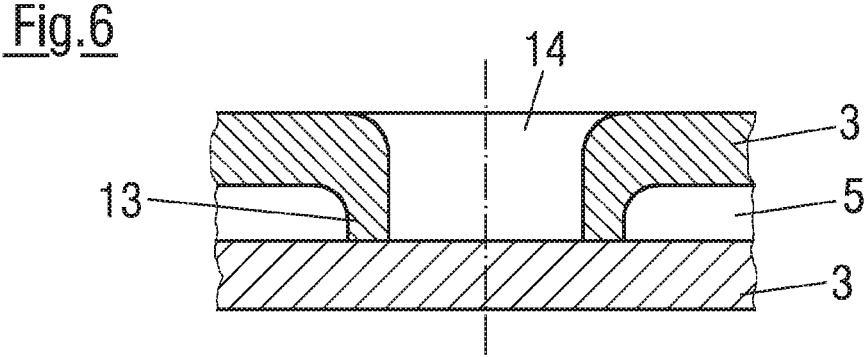
FIG. 6 illustrates a partial cross section through a filter element according to FIG. 5.

For stabilization of internal space 5, use of spacers 13 can be used between opposing filter plates 3. The spacers 13 are easily realized—as shown in FIG. 6—in the embodiment of collars of perforation 14 of filter plate 3 that protrude into internal space 5.

Figure 9:
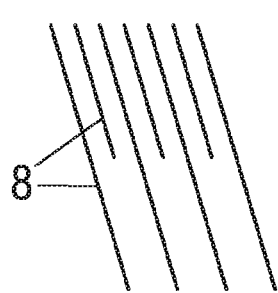
FIG. 9 illustrates a filter plate with varying waves.

In FIG. 9 the arrangement of the waves of a filter plate 3 progressing in a liner manner varies such that the number of waves in the direction of hollow shaft 6 decreases incrementally.

Figure 10:
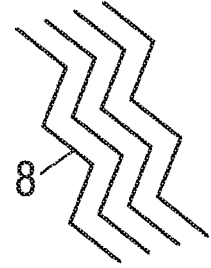
FIG. 10 illustrates a filter plate with non-linear waves.

To further enlarge the filter surface, wave crests 8 can—according to FIG. 10—also progress non-linearly.

Figure 2:
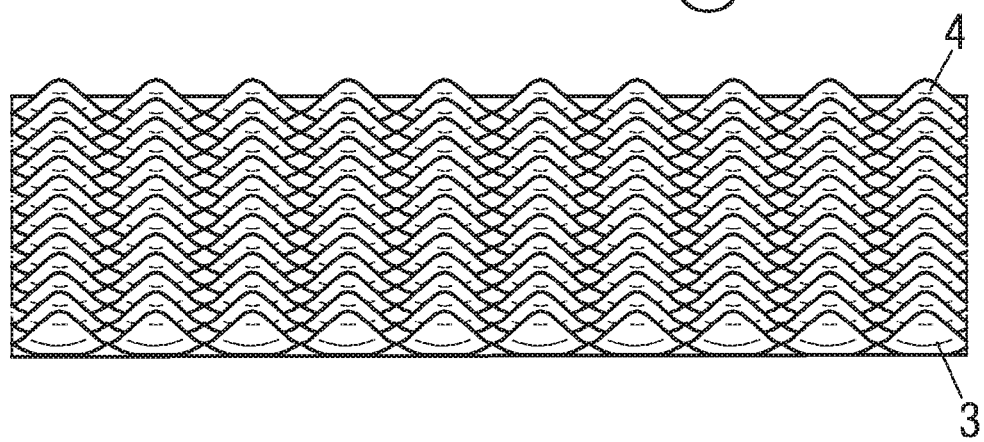
FIG. 2 illustrates a top view onto a filter plate.
Figure 3:
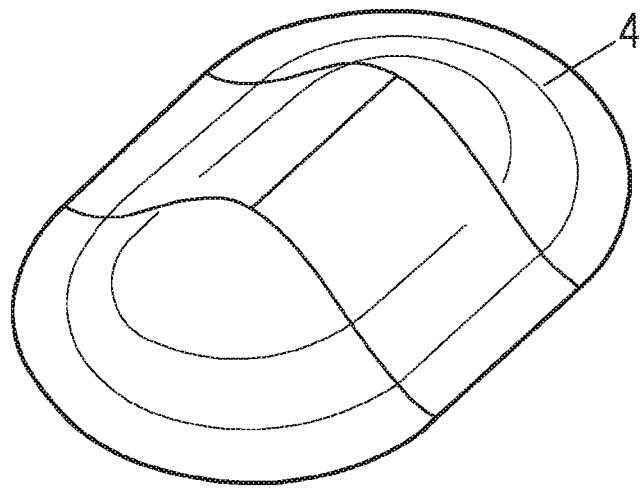
FIG. 3 illustrates elongated elevation.
Figure 7:
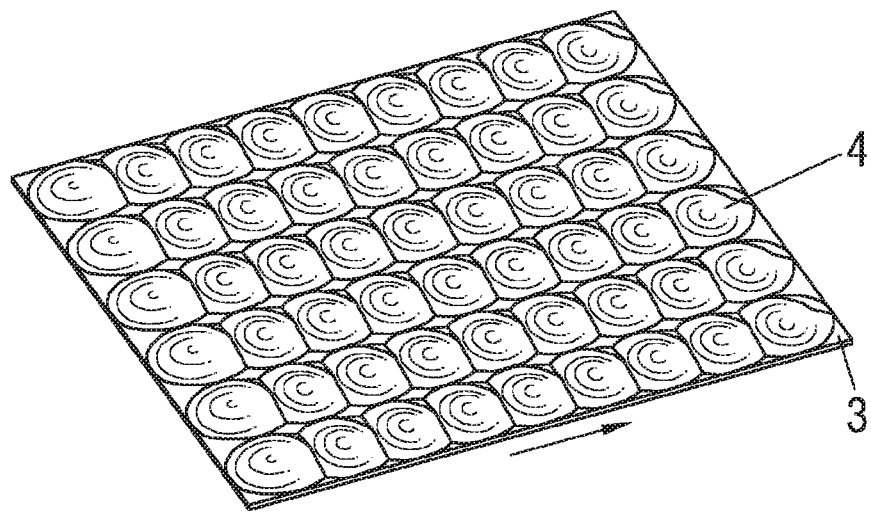
FIGS. 7 and 8 illustrate a filter plate with round elevations.
Figure 8:
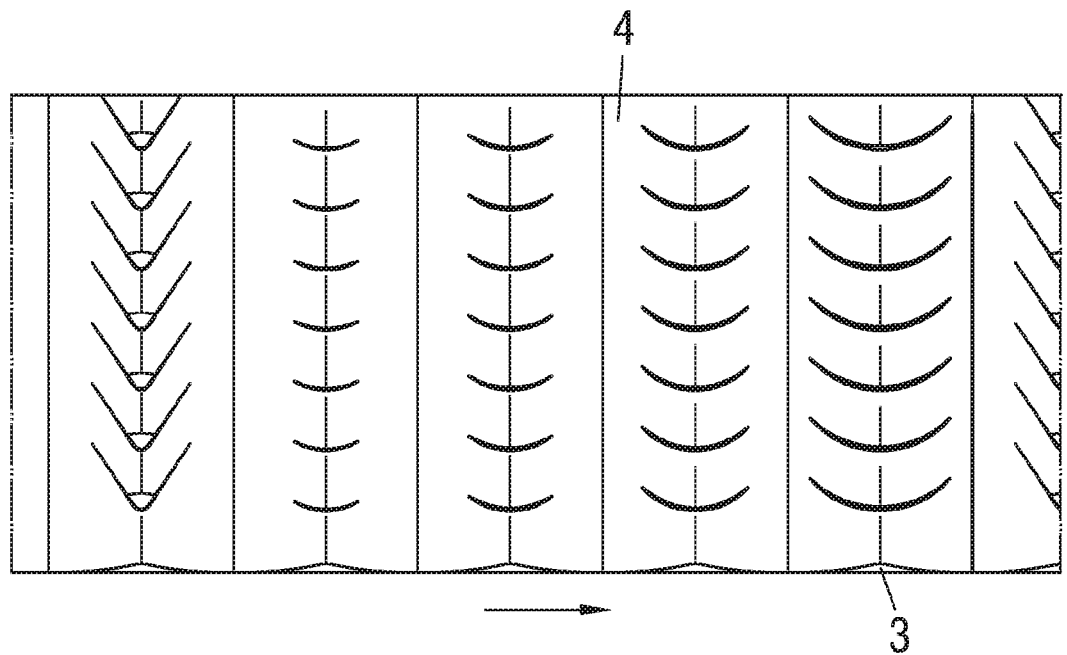

As shown in FIG. 2, elevations 4 of filter plates 3 can be arranged separate from one another or, as shown in FIGS. 7 and 8 can merge in direction of hollow shaft 6.

In the arrangement shown in FIG. 8, the sections between elevations 4 in direction of hollow shaft 6 increase gradually, resulting in that internal space 5 has a number of flow channels flowing in the direction of the vacuum source, wherein the minimum distance between two opposing filter plates 3 of filter element 1 gradually increases in the direction of the vacuum source.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A filter element of a rotating disc filter for separating fluids from a fibrous suspension, comprising:
   a vacuum source;
   at least two filter plates that are each perforated and profiled and have an outside, at least one filter plate of the at least two filter plates including an undulated cross section with wave crests; and
   an internal space defined by and in between the at least two filter plates, the internal space is limited by the at least two filter plates and is connected to the vacuum source,
   wherein each outside of the at least two filter plates that faces away from the internal space has a plurality of elevations whose cross section is round or elongated,
   wherein the at least one filter plate of the at least two filter plates with the undulated cross section has the plurality of elevations at least on the wave crests on the outside.

2. The filter element according to claim 1, wherein the plurality of elevations of at least one filter plate of the at least two filter plates has at least one of different shapes and sizes.

3. The filter element according to claim 1, wherein at least one filter plate of the at least two filter plates is flat.

4. The filter element according to claim 1, wherein the wave crests do not progress in a linear manner.

5. The filter element according to claim 1, wherein the wave crests progress in a linear manner.

6. The filter element according to claim 1, wherein a progression of a wave profile of at least one filter plate of the at least two filter plates varies by sections.

7. The filter element according to claim 1, wherein the at least two filter plates each have wave crests that are tilted toward one another.

8. The filter element according to claim 1, wherein the at least two filter plates each have wave crests that are parallel to one another.

9. The filter element according to claim 8, wherein the wave crests of the outside of one filter plate in each case are arranged opposite to the wave crests of the outside of the other filter plate.

10. The filter element according to claim 8, wherein the wave crests of the outside of one filter plate in each case are arranged opposite to wave troughs of the outside of the other filter plate.

11. The filter element according to claim 1, wherein the internal space has a number of flow channels flowing in a direction of the vacuum source, wherein a minimum distance between two opposing filter plates of the at least two filter plates increases gradually in the direction of the vacuum source.

12. The filter element according to claim 1, wherein the filter element is arranged in the form of circular segments and is fastened to a hollow shaft that is connected with the vacuum source.

13. The filter element according to claim 12, wherein the filter element is configured for forming a circular filter disc by combining together several filter elements.

14. The filter element according to claim 12, wherein the at least two filter plates each have no perforation in an end region leading to the hollow shaft.

15. The filter element according to claim 1, wherein the at least two filter plates that border internal space are connected with one another by a positive interlocking fit.

16. The filter element according to claim 1, wherein the plurality of elevations are located exclusively in a perforated region of each filter plate of the at least two filter plates.

* * * * *